United States Patent
Page et al.

(10) Patent No.: US 11,799,657 B2
(45) Date of Patent: Oct. 24, 2023

(54) SYSTEM AND METHOD FOR PERFORMING BIOMETRIC AUTHENTICATION

(71) Applicant: Cirrus Logic International Semiconductor Ltd., Edinburgh (GB)

(72) Inventors: Michael Page, Gloucestershire (GB); John Paul Lesso, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 64 days.

(21) Appl. No.: 17/253,765

(22) PCT Filed: Oct. 1, 2018

(86) PCT No.: PCT/GB2018/052803
§ 371 (c)(1),
(2) Date: Dec. 18, 2020

(87) PCT Pub. No.: WO2020/012146
PCT Pub. Date: Jan. 16, 2020

(65) Prior Publication Data
US 2021/0288807 A1    Sep. 16, 2021

Related U.S. Application Data

(60) Provisional application No. 62/695,913, filed on Jul. 10, 2018.

(51) Int. Cl.
*H04L 9/32* (2006.01)

(52) U.S. Cl.
CPC .......... *H04L 9/3231* (2013.01); *H04L 9/3242* (2013.01); *H04L 9/3252* (2013.01)

(58) Field of Classification Search
None
See application file for complete search history.

(56) References Cited

U.S. PATENT DOCUMENTS

| | | | |
|---|---|---|---|
| 2010/0273417 A1* | 10/2010 | Tian | H04M 1/6066 455/41.2 |
| 2011/0178931 A1 | 7/2011 | Kia | |
| 2013/0246800 A1 | 9/2013 | Stewart | |
| 2014/0046664 A1 | 2/2014 | Sarkar et al. | |

(Continued)

FOREIGN PATENT DOCUMENTS

| | | | | |
|---|---|---|---|---|
| CA | 3005404 A1 | 8/2015 | | |
| CN | 107241689 A * | 10/2017 | ............. | G10L 15/30 |

(Continued)

OTHER PUBLICATIONS

International Search Report and Written Opinion of the International Searching Authority, International Application No. PCT/GB2018/052803, dated Nov. 14, 2018.

(Continued)

*Primary Examiner* — Benjamin E Lanier
(74) *Attorney, Agent, or Firm* — Jackson Walker L.L.P

(57) ABSTRACT

There is described a system and method for performing biometric authentication, preferably voice biometric authentication. The system has a host device such as a mobile phone and a coupled headset device. The headset device is arranged to receive audio, and to cryptographically protect the audio before transmission to the host device for verification and biometric authentication.

25 Claims, 3 Drawing Sheets

(56) References Cited

U.S. PATENT DOCUMENTS

| | | | |
|---|---|---|---|
| 2014/0237256 A1* | 8/2014 | Ben Ayed | H04W 12/033 |
| | | | 713/186 |
| 2015/0186636 A1* | 7/2015 | Tharappel | G06F 21/32 |
| | | | 726/8 |
| 2016/0224774 A1* | 8/2016 | Pender | G06F 21/32 |
| 2018/0020318 A1* | 1/2018 | Ramappa | H03M 3/024 |
| 2018/0176215 A1* | 6/2018 | Perotti | H04L 63/0853 |
| 2018/0240463 A1* | 8/2018 | Perotti | G10L 17/22 |
| 2018/0375660 A1* | 12/2018 | Yildiz | G06V 40/13 |
| 2019/0012448 A1* | 1/2019 | Lesso | H04L 63/0861 |

FOREIGN PATENT DOCUMENTS

| | | | | |
|---|---|---|---|---|
| CN | 111084626 A | * | 5/2020 | A61B 10/0096 |
| EP | 2178235 A1 | * | 4/2010 | H04K 1/04 |
| WO | WO-0111824 A2 | * | 2/2001 | H04L 12/00 |

OTHER PUBLICATIONS

Machine translation from Espacenet of Application No. CN111084626A.

* cited by examiner

SYSTEM AND METHOD FOR PERFORMING BIOMETRIC AUTHENTICATION

The present application is a 371 of International Patent Application No. PCT/GB2018/052803, filed Oct. 1, 2018, which claims priority to U.S. Provisional Patent Application Ser. No. 62/695,913, filed Jul. 10, 2018, each of which is incorporated by reference herein in its entirety.

FIELD

The field of representative embodiments of this disclosure relates to methods and associated systems for performing biometric authentication, including but not limited to ones concerning voice biometric authentication.

BACKGROUND

Biometric-based authentication is often used to verify the identity of a user. In addition to well-known biometrics such as finger print identification, it is also possible to use the voiceprint of a user to identify the user and to verify secure commands and transactions.

One of the challenges with such biometric-based authentication is the need to protect such an authentication system against malicious attacks. One possible attack on such authentication systems is to intercept audio data from a microphone before it reaches the authentication module, and to replace the audio data with malicious commands. In the case of relatively insecure links between a host device and a coupled accessory, e.g. a headset device, this can represent a considerable attack vector for the entire biometric authentication system.

As a result, there is a need to provide a biometric authentication system having increased robustness to such attacks.

SUMMARY

Accordingly, there is provided a method for performing biometric authentication for a system having a host device and a coupled headset device, the host device having a biometrics module for performing biometric authentication, the method comprising the steps of:
a) receiving audio at a headset device;
b) performing a cryptographic protection of the received audio by performing at least one of cryptographically signing or encrypting the audio at the headset device to provide protected audio;
c) transmitting the protected audio from the headset device to a biometrics module at a host device;
d) verifying the protected audio by verifying the cryptographic signature or decrypting the protection audio at the biometrics module; and
e) responsive to said verification, performing a biometric authentication on the audio at the biometrics module.

The method performs a cryptographic protection process which comprises encrypting and/or cryptographically signing the audio at the headset device, which can allow for the audio to be later authenticated downstream of the headset device. Providing such an end-to-end cryptographic protection of the audio data directly from the headset device to the biometrics module ensures that the audio received at the biometrics module is a secure representation of what was received at the headset device. Such protection prevents against any malicious attacks or hacks of the audio data via the communications path between the headset device and the biometrics module, such as malicious modification or substitution of the audio data in order to subvert the biometrics function. It will be understood that the headset device may comprise any suitable device arranged to receive audio from a user, preferably a wearable device, e.g. an audio headset, headphones, earbuds, etc. It will also be understood that the host device may comprise any suitable data processing device provided with a biometrics module for user authentication, e.g. a mobile phone, a tablet computer, a personal computer, etc. It will be understood that the host device and the headset device will be communicatively coupled with each other, e.g. via a wired or wireless link between the devices.

It will be further understood that the "audio" of steps (b)-(e) may comprise a digital version of the audio signal received at the headset device, or the "audio" may comprise data representative of the audio originally received. For example, the method may comprise the additional step of performing a feature extraction on the received audio, to provide feature data which is representative of the received audio. The subsequent steps of performing a cryptographic protection, transmitting, verifying, and performing a biometric authentication being performed on the feature-extract-version of the received audio. Such feature-extract-version of the received audio may be particularly suitable for use in various biometric authentication techniques, e.g. ear biometrics.

In a particularly preferred aspect, the received audio comprises speech, which is subsequently authenticated in a voice biometrics authentication module. Additionally or alternatively, the received audio may comprise an acoustic response or an otoacoustic emission from an ear of a user, which is subsequently verified in an ear biometrics authentication module.

Preferably, the step of transmitting comprises:
establishing a communications link between the headset device and the biometrics module on the host device; and
sending the protected audio from the headset device to the biometrics module on the host device via said communications link.

Preferably, the step of establishing a communications link comprises establishing a communications link between a cryptographic protection module on the headset and the biometrics module on the host device, which includes a pass-through link via a data processing element of the host device, e.g. through an Applications Processor of the host device.

As the data link between the headset and the biometrics module of the host device will likely pass via an Applications Processor (AP) of the host device, the cryptographic protection of the received audio reduces the risk of malicious attacks on the audio data as it passes through the AP. Preferably, the communications link comprises an unmodified bit-exact data path between the headset and the biometrics module.

In an alternative embodiment, the step of establishing a communications link comprises establishing a direct communications link between a cryptographic protection module on the headset and the biometrics module on the host device, without intervening data processing elements, e.g. without linking through an Applications Processor of the host device.

Such a direct communications link may be using a direct USB interface between the headset and the host device modules.

Preferably, the step of establishing a communications link comprises:
    establishing an asynchronous data path between the headset device and the biometrics module on the host device.

The use of an asynchronous data path allows for audio data to be transmitted from the headset to the biometrics module faster than in real time, so that buffered audio data can be instantly transmitted to recover any latency losses, e.g. bring-up latency associated with establishing the communications link between the headset device and the biometrics module on the host device.

Preferably, the step of establishing a communications link comprises:
    establishing a wired communications link with an asynchronous communications protocol, e.g. using USB link with a USB Serial endpoint type or any suitable wired communications protocol, or
    establishing a wireless communications link with an asynchronous communications protocol, e.g. using BluTooth with RFCOMM protocol, or any suitable wireless communications protocol.

Preferably, the method comprises the steps of:
    receiving a trigger event at the headset device indicative of a user interaction,
    wherein at least one of steps (b)-(e) are performed responsive to said step of receiving a trigger event.

When the subsequent method steps are dependent on the receipt of a trigger event, accordingly the encryption, communication and subsequent authentication are performed when required by the system, usually at a low duty cycle resulting in low-power operation. For example, transmission of cryptographically protected audio from a headset device to a host device may require establishing a relatively-high-power wireless communication link between the devices.

Preferably, the step of receiving a trigger event comprises at least one of the following:
    receiving an indication of a voice keyword detection, from the headset device and/or from the host device;
    receiving an indication of a voice activity detection, from the headset device and/or from the host device; or
    receiving an indication of a physical user interaction, from the headset device and/or from the host device.

The physical user interaction may comprise any suitable input signal, e.g. a mechanical button press from a user of the headset or the host device, a capacitive sensor input, an ultrasonic sensor input, a proximity detect, etc.

The method further comprises the steps of:
    buffering the received audio at the headset device; and
    responsive to receiving a trigger event at the headset device, performing at least one of steps (b)-(e) on the buffered audio.

Preferably, the step of buffering the received audio is continuously performed. This allows for additional audio data to be stored and accessed when required, which can aid in authentication and/or subsequent speech recognition or command recognition. The system may be configured to buffer a set duration of audio, e.g. 1 second, 3 seconds, 5 seconds, 10 seconds, etc.

In a preferred embodiment, the step of transmitting comprises:
    transmitting the protected buffered audio from the headset device to the biometrics module at the host device using an asynchronous data link.

By buffering the received audio which can be transmitted using an asynchronous data transfer, the steps of performing protection and transmitting can be executed immediately and quicker than real-time, to allow for low latency transmission of the audio data to the host device for subsequent verification and biometric identification.

Preferably, the step of performing a cryptographic protection comprises:
    creating a cryptographic digital signature of the received audio,
    wherein the step of transmitting comprises transmitting the received audio with the cryptographic digital signature.

The step of cryptographically signing the received audio may comprise a Symmetric signing of data (e.g. HMAC) or an Asymmetric signing of data (e.g. DSA or ECDSA).

Additionally or alternatively, the step of performing a cryptographic protection comprises:
    creating an encrypted version of the received audio,
    wherein the step of transmitting comprises transmitting the encrypted version of the received audio.

Preferably, the step of performing a cryptographic protection comprises cryptographically signing or encrypting the received audio at the headset device within a CODEC provided in the headset device.

Preferably, the method comprises the further step of:
    responsive to said voice biometric authentication, initialising audio playback from the host device to the headset device based on the result of said voice biometric authentication.

The audio playback may be playback of secure information from the host device to the headset. Additionally or alternatively, the audio playback may comprise audio settings specific to an authenticated user (e.g. user-specific playback settings such as treble, bass, ANC, etc.).

In one embodiment, audio playback may be via the same communications link established for sending the protected audio from the headset device to the biometrics module on the host device.

Preferably, audio playback is via the asynchronous data path between the headset device and the biometrics module on the host device. Alternatively, audio playback is via a parallel isochronous data path between the headset device and the host device.

In a further aspect of the disclosure, the method comprises the step of performing audio processing of the received audio at the headset device in parallel to steps (b)-(e).

The audio processing can be performed on an unencrypted or unsigned version of the received audio, parallel to a cryptographic protection module of the headset.

The step of performing audio processing may comprise performing active noise control at the headset device based on the received audio.

It will be understood that such active noise control may be using any standard noise control techniques. In one aspect, the active noise control comprises performing noise reduction processing at the headset device on the audio received from the microphone.

Preferably, the method further comprises the step of:
    at the host device, verifying the headset device prior to the steps of verifying the protected audio at the biometrics module and performing a voice biometric authentication on the verified received audio at the biometrics module.

Verifying the headset device ensures that cryptographically protected audio is only ever received from a trusted device coupled with the host device.

Preferably, the step of verifying the headset device comprises a cryptographic verification of the headset device. Such a cryptographic verification may comprise a public key authentication.

There is also provided a system for performing biometric authentication arranged to implement the above-described method.

Preferably, the system comprises:
a host device, the host device comprising a voice biometrics authentication module; and
a headset device coupled with said host device, the headset device arranged to receive audio comprising speech,
wherein the headset device comprises a cryptographic protection module arranged to perform a cryptographic protection of received audio, the headset device arranged to transmit the protected audio from the headset device to the voice biometrics module at the host device, and
wherein the voice biometrics module at the host device is arranged to verify the protected audio at the biometrics module, and responsive to said verification, the voice biometrics module is arranged to perform a voice biometric authentication on the received audio.

It will be understood that the host device and the headset device may be configured to perform alternative biometric authentication, e.g. as part of an ear biometric authentication system.

The headset device may comprise any suitable device arranged to receive audio from a user, preferably a wearable device, e.g. an audio headset, headphones, earbuds, an audio pendant, etc.

The host device may comprise any suitable data processing device provided with a biometrics module for user authentication, e.g. a mobile phone, a tablet computer, a personal computer, etc.

It will be understood that the host device and the headset device may be communicatively coupled with each other, e.g. via a wired or wireless link between the devices.

Preferably, the headset device comprises a microphone or other audio transducer suitable for receiving audio.

There is further provided a headset device for use in the above system for performing voice biometric authentication.

There is further provided a host device for use in the above system for performing voice biometric authentication.

EXAMPLE EMBODIMENTS OF THE PRESENT DISCLOSURE

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

DESCRIPTION

For a better understanding of examples of the present disclosure, and to show more clearly how the examples may be carried into effect, embodiments will now be described, by way of example only, with reference to the accompanying drawings, in which.

Figure 1:
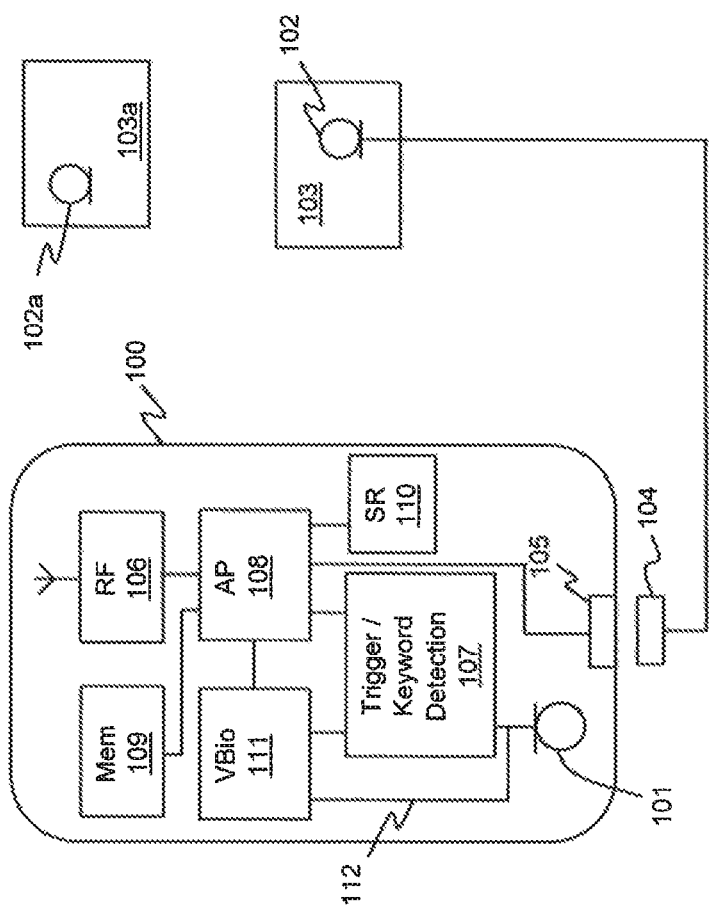
FIG. 1 is an illustrative overview of a system for performing biometric authentication.

FIG. 1 illustrates one example of an electronic device 100, such as a mobile telephone or tablet computer for example. The electronic device 100 may comprise at least one microphone 101 which receives audio corresponding to detected sounds and provides audio signals to the electronic device. A microphone 101 of the electronic device 100 may provide an analogue microphone audio signal but in some embodiments the microphone 101 may be a digital microphone that outputs a digital microphone audio signal.

The device 100 is operable, in use, to receive audio signals from at least one external microphone 102/102a of an accessory apparatus 103/103a, which may receive audio corresponding to detected sounds at the accessory 103/103a. An accessory apparatus 103 may, in some instances, be removably physically connected to the electronic device 100 for audio data transfer, for instance by a connector 104 of the accessory apparatus making a mating connection with a suitable connector 105 of the electronic device, for example via a universal serial bus link (USB). Audio data received from the accessory apparatus comprises digital audio data.

An accessory apparatus 103a may be configured for local wireless transfer of audio data from a microphone 102a of the accessory apparatus 103a to the electronic device 100, for instance via a wireless module 106 of the electronic device 100. Such wireless transfer could be via any suitable wireless protocol such as WiFi™ or Bluetooth™ protocol for example.

Audio data from an on-board microphone 101 of the electronic device 100 and/or audio data from a microphone 102/102a of the accessory apparatus 103/103a may be processed in a variety of different ways depending on the operating mode or use case of the electronic device 100 at the time. It will be understood that the received microphone audio data may be processed by audio processing circuitry which may, for instance comprise an audio codec and/or a digital signal processor (DSP) for performing one or more audio processing functions, for instance to apply gain and/or filtering to the signals, for example for noise reduction.

A control processor 108 of the electronic device, often referred to as an applications processor (AP), may control at least some aspects of operation of the electronic device and may determine any further processing and/or routing of the received audio data. For instance for telephone communications, the received audio data may be forwarded to the wireless module 106 for transmission. For audio or video recording, the data may be forwarded for storage in a memory 109. For voice control of the electronic device 100, the audio data may be forwarded to a speech recognition module 110 to distinguish voice command keywords.

The device 100 comprises a voice biometric authentication module 111 for analysing audio data received from microphone 101 and/or 102 and determining whether the audio data corresponds to the voice of a registered user, i.e. for performing speaker recognition.

The voice biometric authentication module 111 receives input audio data, e.g. from the microphone 101, and compares characteristics of the received audio data with user-specific reference templates specific to a respective pre-registered authorized user (and maybe, for comparison, also with reference templates representative of a general population). Voice/speaker recognition techniques and algorithms are well known to those skilled in the art and the present disclosure is not limited to any particular voice recognition technique or algorithm.

The voice biometric authentication module 111 may be activated according to a control input conveying a request for voice biometric authentication, for example from the AP 108. For example, a particular use case running on the AP 108 may require authentication to wake the device 100, or to authorize some command, e.g. a financial transaction. If the received audio data corresponds to an authorized user, the voice biometric authentication module 111 may indicate this positive authentication result, for example by a signal BioOK which is sent to the AP 108. The AP 108 (or a remote server that has requested the authentication) may then act on the signal as appropriate, for example, by authorizing some activity that required the authentication, e.g. a financial transaction. If the authentication result were negative, the activity, e.g. financial transaction, would not be authorised.

In some embodiments, the voice biometric authentication module 111 may be enabled by a voice activity event detected, for example, by the trigger detection or keyword detection module 107 or another dedicated module (not shown). For example, when the device 100 is in a low-power sleep mode, any voice activity may be detected and a signal VAD (voice activity detected) communicated to the biometric authentication module 111. In the event of a positive user authentication, the signal BioOK may be used by the AP 108 to alter the state of the device 100 from the low-power sleep mode to an active mode (i.e. higher power). If the authentication result were negative, the mode change may not be activated.

Preferably, there is a signal path 112 for providing audio data directly from a microphone 101 to the voice biometric authentication module $111_{[LS1]}$ for the purposes of voice authentication, the path 112 in addition to the direct coupling of the microphone 101 to the trigger/keyword detection module 107. In some embodiments, the trigger/keyword detection 107 may be provided as part of the voice biometric authentication module 111. In a particularly preferred embodiment, audio data from microphone 101 of the electronic device 100 or from a microphone 102,102a of an accessory apparatus 103,103a is provided to the voice biometric authentication module 111 via the AP 108 and/or via the trigger/keyword detection 107 or via a path including some other processing modules. While in prior art system such a path may be open to attack via malicious code present on the AP 108, embodiments of the present disclosure provide protection against such attack vectors.

While voice biometric authentication module 111 has been illustrated as a separate module in FIG. 1 for ease of reference, it will be understood that the voice biometric authentication module 111 may be implemented as part of or integrated with one or more of the other modules/processors described, for example with speech recognition module 110. In some embodiments, the voice biometric authentication module 111 may be a module at least partly implemented by the AP 108 which may be activated by other processes running on the AP 108. In other embodiments, the voice biometric authentication module 111 may be separate to the AP 108 and in some instances may be integrated with at least some of the functions of the codec/DSP 107.

As used herein, the term 'module' shall be used to at least refer to a functional unit or block of an apparatus or device. The functional unit or block may be implemented at least partly by dedicated hardware components such as custom defined circuitry and/or at least partly be implemented by one or more software processors or appropriate code running on a suitable general purpose processor or the like. A module may itself comprise other modules or functional units.

The AP 108 may typically be capable of running many different applications or software processes and may be configured so that software processes may be installed from outside sources by a user directly into the processor 108 and associated memory 109, for instance via connector 105 or via the wireless module 106 for example. This provides a route for malicious software (malware) to be installed surreptitiously, and for this malware to corrupt the operation of the biometric authentication.

For example, it may be possible that malware may be installed to run on an insecure area of the AP 108 and which may attempt to access a service which requires authentication from the voice biometric authentication module 111. The voice biometric authentication module 111 itself may be secure, in that an authentication signal from the voice biometric authentication module 111 cannot be faked and in that the voice biometric authentication module 111 will only generate an authentication signal indicating that authentication is successful if the audio input supplied to the voice biometric authentication module 111 does match the registered user. However, it is conceivable that malware may be arranged to generate false audio data and provide said false audio to the voice biometric authentication module 111 as if it were genuine audio data from a user, the false data being selected to have a chance of being falsely recognised as matching the registered user.

For instance, it may be possible for an attacker to defeat voice biometric authentication by recording a registered user speaking without their knowledge and using such recording later when attacking a secure service. In practice, it may be quite difficult for a third party to use some sort of separate recording device to obtain a good quality recording of a user without that user's knowledge, but if malware were installed on the user's device, the malware may be arranged to record the user's voice (using the user's device) without the user being aware.

To guard against such an attack using a recording of a user's voice, it is known for some applications that use$_{[LS2]}$ voice biometric authentication to, in the event that a request to access a secure service is received, generate a prompt to prompt the user to say one or more selected words or phrases. The words or phrases may be selected with a degree of randomness so as to vary each time in an unpredictable way. This requires the user to utter the words or phrase corresponding to the prompt. If the correct prompt is then uttered and the voice corresponds to the relevant user, then the authentication result may be positive; otherwise the authentication will fail. i.e. produce a negative authentication result.

If malware has been inadvertently installed in the electronic device AP 108, then it is possible that the malware may be configured to, unknown to the user, record and/or analyse voice data from the user over time. A user's audio from an accessory device may be subverted or intercepted and captured by malware as it passes through the AP 108 from the USB interface 105 to the biometrics module 111. When sufficient data has been recorded and/or analysed, the malware may attempt to access the secure service. The secure service may then trigger the voice biometric authentication module 111 to perform authentication. The malware may then supply an audio signal which is synthesised or formed from the various recordings of the user's voice to correspond to the required input for the voice biometric authentication module. If this faked or previously-recorded audio signal is good enough, the voice biometric authentication module 111 will recognise the audio as corresponding to the registered user and falsely generate a positive authentication result.

Embodiments of the present disclosure relate to methods and apparatus that at least mitigate at least some of the above-mentioned issues. In particular, for some embodiments, audio data from an accessory device may be authenticated as genuinely having been captured by the accessory device.

Figure 2:
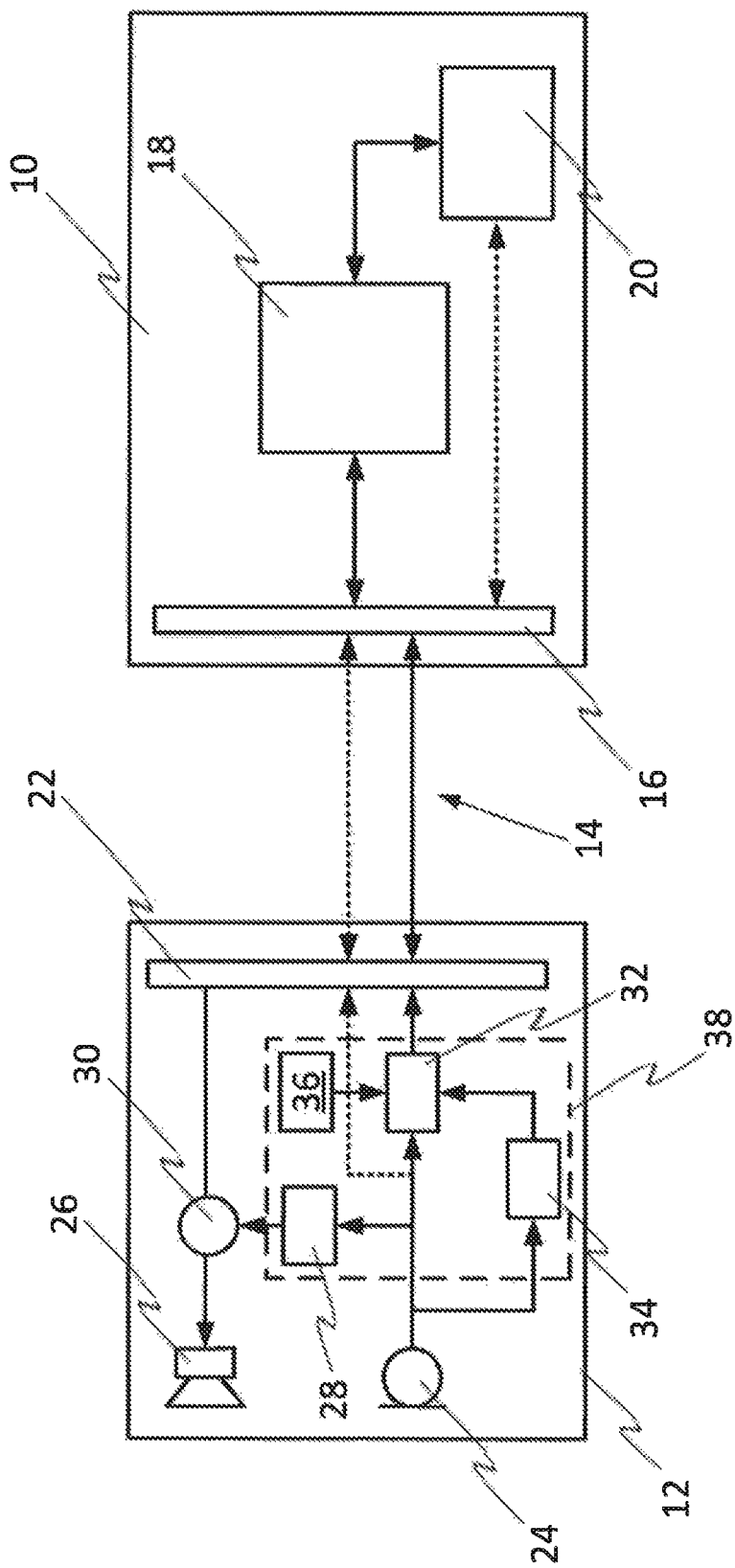
FIG. 2 is an illustrative view of a host device and a headset device.

An example embodiment of a biometric authentication system is shown in FIG. 2. The system comprises a host device 10 such as a personal computing device, a mobile phone, a tablet computer, etc., and a communicatively coupled accessory device 12, in the form of a headset device 12, such as a headset, earphones, earbuds, etc. The host device 10 and the headset device 12 are communicatively coupled via a communications link indicated at 14. The communications link 14 may be provided as a wired or wireless data link between the devices 10,12.

The host device 10 may comprise modules as previously mentioned with respect to device 100 of FIG. 1. Host device 10 comprises a data interface 16 for communication with the communications link 14. The data interface 16 is arranged to allow for data to be input to and output from the device 10. The host device 10 comprises a central controller 18 such as an Applications Processor (AP), which is arranged to control operation of the host device 10. The host device 10 further comprises a biometric authentication module 20 which is coupled with the AP 18, and in some embodiments coupled directly to the data interface 16.

As described above, the biometric authentication module 20 receives input audio data, e.g. from a host device microphone (not shown) or from an accessory device 12, and compares characteristics of the received audio data with user-specific reference templates specific to a respective pre-registered authorized user (and maybe, for comparison, also with reference templates representative of a general population). Preferably, the biometric authentication module 20 is a voice biometric authentication module arranged to perform analysis of a user's voice in the received audio. Voice/speaker recognition techniques and algorithms are well known to those skilled in the art and the present disclosure is not limited to any particular voice recognition technique or algorithm.

In an additional or alternative aspect, the biometric authentication module 20 comprises an ear biometric authentication module, which is arranged to perform analysis of audio data which is characteristic of a user's ear. Such audio data may be audio responsive to a probe signal output into a user's ear, or may be the otoacoustic emission received from a user's ear after appropriate stimulation. Ear biometric recognition techniques and algorithms are well known to those skilled in the art and the present disclosure is not limited to any particular ear recognition technique or algorithm.

The headset device 12 comprises a data interface 22 for communication with the communications link 14. The data interface 22 is arranged to allow for data to be input to and output from the headset device 12. The headset device 12 comprises at least one microphone 24 for receiving audio. The microphone 24 may be provided as an analogue microphone or a digital microphone. The headset device 12 further comprises a loudspeaker 26 or other suitable audio transducer arranged to output audio at the headset device 12. The loudspeaker 26 may output music or other audio communicated from the host device 10. Additionally, the loudspeaker 26 may output an audio signal as part of an ear biometric authentication process. Such an audio signal may be used to measure the response or resonance of a user's ear canal, or to stimulate an otoacoustic emission from a user's ear, which may subsequently be authenticated in an ear biometric authentication module.

The headset device 12 comprises a cryptographic protection module 32, which is arranged to perform a cryptographic protection of the received audio data. The cryptographic protection may comprise a cryptographic signing of the audio data, e.g. using a message authentication certificate (MAC) or similar approach. The cryptographic signing of the received audio may comprise a Symmetric signing of data (e.g. using HMAC) or an Asymmetric signing of data (e.g. using DSA or ECDSA).

Additionally or alternatively, the cryptographic protection may comprise performing an encryption of the received audio data.

As the received audio is encrypted and/or signed, it can then be transmitted to the host device 10 as protected audio, where the data can be decrypted and/or the signature verified at the biometrics module 20, to ensure that the audio on which the biometric authentication is to be performed is verified as the audio received at the headset device 12.

The cryptographic protection may be performed in real time on the received audio data. In a preferred embodiment, the headset device 12 comprises a buffer 34 which is arranged to buffer audio received via the microphone 24. The buffer 34 may be configurable to store a set duration of audio received by the microphone 24, e.g. 1 second, 3 seconds, 5 seconds, 10 seconds, etc. The cryptographic protection may accordingly be performed on the audio data contained in the buffer 34.

While the above-described system performs cryptographic protection of the audio signal received at the headset device 12 for later verified biometric authentication of the audio signal, it will be understood that in an alternative embodiment, the cryptographic protection and subsequent biometric authentication may be performed on audio data representative of the audio signal received at the headset device 12. For example, some biometric techniques operate based on features extracted from an audio signal. As a result, the biometrics module 20 only requires receipt of such a feature data version of the audio. In such an embodiment, the headset device 12 may be configured to perform a feature extraction on the received audio, to provide a feature-extract-version of the audio which is representative of the received audio.

The headset device 12 may be provided with a trigger detector module 36. The trigger detector module 36 is arranged to receive a trigger event which is indicative of a user interaction with the headset device 12. The trigger event may comprise at least one of the following: the output of a voice keyword detect (VKD) module, from the headset device and/or from the host device; the output of a voice activity detect module (VAD), from the headset device and/or from the host device; or a signal arising from detection of some physical user interaction from the headset device and/or from the host device, such as a mechanical button press from a user of the headset or the host device, a capacitive sensor input, an ultrasonic sensor input, a proximity detect, etc.

The trigger detector module 36 may act to initialise one or more aspects of the system on receipt of a suitable trigger event. For example, the protection, communication and/or subsequent authentication will only be performed when required by the system, resulting in low-power operation. As the transmission of audio data and cryptographic authentication from the headset device 12 to the host device 10 may require establishing a relatively-high-power wireless communication link between the devices: accordingly the use of suitable triggers may allow a low-power always-on operation of the system.

When it is desired to communicate cryptographically protected audio data from the headset device 12 to the host device 10, the system is configured to establish a communications link between the headset device and the biometrics module on the host device for transmission of the cryptographically protected audio data.

The communications path to the biometrics module may pass through the AP. The cryptographic signing of the audio data may be adequate to ensure that the data is not affected, tampered, or substituted by any malware before arriving at the biometric module.

In one aspect, the system acts to setup a communications link between the headset device 12 at the host device 10, preferably between a processor 38 in the headset 12 and the AP 18 in the host 10. The communications link may be over a wired interface such as USB, or a wireless or RF interface such as BlueTooth® protocol. A combination of data interfaces and firmware in the headset device 12 and firmware in the AP 18 implements an asynchronous bit-exact data path between a cryptographic protection module 32 of the headset 12 and a biometrics module 20 of the host 10.

The use of a bit-exact data path ensures that no data is lost between the headset device 12 and the host device 10, allowing cryptographic verification at the host device to operate. The use of an asynchronous data transfer allows any data that has been temporarily buffered, for instance during any bring-up latency associated with establishing the communications link between the headset device and the biometrics module or while awaiting the result of voice activity or keyword detection, to be transmitted at a relatively high data rate, faster than real-time, to at least partially recover any such latency.

As described above, the audio data received at the headset 12 may be transmitted using a cryptographically authenticated link via the cryptographic authentication module 32, e.g. for the purposes of biometric authentication or other processes requiring secure communications, e.g. voice command recognition.

Additionally, the received audio data may be transmitted using a non-cryptographically authenticated link. Such unsigned or unencrypted audio data may be used for processes such as voice calls for example to allow the use of established signal routing and call management methods. Also, some signal processing in the headset device 12 such as Transmit-side Active Noise Cancellation (Tx ANC), may be desirable to improve audio SNR of audio to be sent over the public wireless network, but may introduce spectral coloration that renders the resulting signal poor for biometric authentication processes. As a result, a parallel transmission of such processed audio data may be used in addition to the transmission of the unprocessed, yet signed or encrypted, audio data.

Audio received via the microphone 24 may also be processed by signal processing module 28 within the headset device 12 to provide a component mixer 30 with any audio data received from the host device 10 to be rendered through the loudspeaker 26. For example, the received audio may be used to provide a sidetone signal to compensate for occlusion effects.

The system may be configured such that responsive to a biometric authentication, audio playback from the host device to the headset device may be initialised based on the result of the biometric authentication. The audio playback may be playback of secure information from the host device to the headset, for example an audio user prompt. Additionally or alternatively, the audio playback may comprise audio settings specific to an authenticated user (e.g. user-specific playback settings such as treble, bass, ANC parameters, etc.). The audio playback may be via same communications link established for sending the audio and the cryptographic authentication from the headset device 12 to the biometrics module 20 on the host device 10. For example, the link may comprise a frame-based data format with defined channels for signed audio data, unsigned audio data and control data in each transmission direction.

The system may be configured wherein the host device 10 is arranged to verify the identity of the headset device 12 before receiving audio data from the headset device 12, for example by performing a cryptographic verification of the headset device using public key authentication.

It will be understood that various modules of the headset device, e.g. the signal processing module 28, the cryptographic protection module 32, the buffer 34, and/or the trigger detector module 36 may be provided as separate elements within the headset device 12, or may be provided as part of a larger signal processing module 38, such as an audio codec device provided in the headset device 12. It will be understood that an audio codec device may be provided as a circuit which serves substantially to receive, process, and output (analog or digital) audio signals. It may include audio ADC, audio DAC and output audio driver amplifiers.

Figure 3:
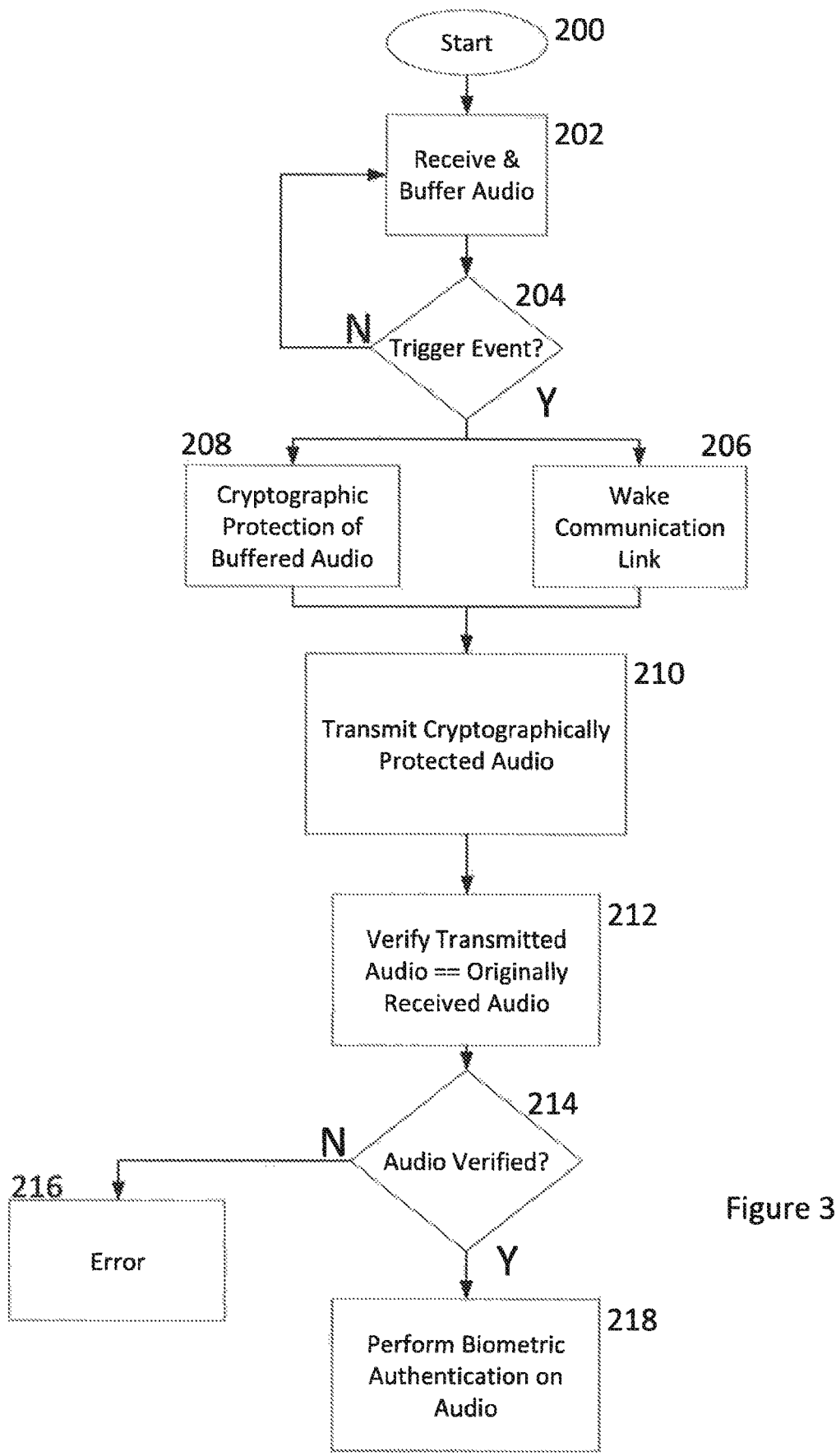
FIG. 3 is a process view of a method for performing biometric authentication.

With reference to FIG. 3, an example method of operation of a biometric authentication system as described above is as follows:

The headset device 12 comprises an audio buffer 34, which upon initialisation (step 200) continuously buffers audio received from a microphone 26 or microphones of the headset device 12 (step 202). During this time, the communications link 14 is in an at least partially inactive or low-power state, for reduced power consumption.

On detecting a trigger event (step 204), the trigger event detected at the headset device 12 or communicated from the host device 10 to the headset device 12, the headset device 12 initiates activation of the communications link 14 (step 206), between the headset device 12 and the host device 10. The contents of the audio buffer 34 are cryptographically protected by encryption or cryptographic signing (step 208). Once the link 14 is active, the buffer contents accumulated during the time it took to detect the trigger event and transition the link 14 into the active state is transferred from the headset device 12 to the host device 10 faster than real time using an asynchronous data path, along with any related cryptographic signature for any signed data (step 210).

Preferably, the cryptographic protection of the audio data is performed responsive to the detection of a trigger event. In an alternative aspect, the system may continually perform cryptographic protection of the contents of the audio buffer 34. Such continual protection may be useful if the buffer 34 in the headset device 12 is vulnerable to malware or other malicious attacks.

After the buffer 34 is initially emptied, subsequent accumulated buffer content may be periodically transferred over the link in faster-than-real-time bursts. This period may be much shorter than the initial time taken to detect the trigger event and wake the communications link 14. In-between data bursts, the communications link 14 may return to a low-power at least partially-inactive state. It will be appreciated that such a state of periodically transferring buffer content may continue indefinitely, as an equivalent to an isochronous data transport between the headset and the host device.

The host device 10 is configured to verify that the audio data transmitted via the link 14 and received at the host device 10 is the same audio data that was originally received at the headset device 12 (step 212). This is done based on the cryptographic protection method used by the system, as described above. For example, the host device 10 may verify the cryptographic signature transmitted with the audio data, or the host device 10 may act to decrypt an encrypted version of the audio data. This verification step is preferably performed in the biometrics module 20 of the host device 10.

After verification (step 214), if the audio data is verified that it is the same as originally received at the headset device 12, then the biometrics module 20 proceeds to perform a biometric authentication on the received audio (step 218), the result of which may be used in any suitable subsequent operation of the host device 10 requiring biometric authentication, e.g. voice assistant command processing, transaction authorisation, etc.

If the verification of the received audio data fails (step 216), the system may act to generate an error message.

It should be understood—especially by those having ordinary skill in the art with the benefit of this disclosure— that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

The invention claimed is:

1. A method for performing biometric authentication for a system having a host device and a coupled headset device, the host device having a biometrics module for performing biometric authentication, the method comprising the steps of:
   a) receiving audio at a headset device;
   b) performing a cryptographic protection of the received audio by performing at least one of cryptographically signing or encrypting the received audio at the headset device to provide protected audio;
   c) transmitting the protected audio from the headset device to the biometrics module at the host device;
   d) verifying the protected audio by verifying the cryptographic signature or decrypting the protected audio at the biometrics module; and
   e) responsive to said verification, performing a biometric authentication on the audio at the biometrics module;
   wherein the method further comprises:
   performing, at the headset device, audio processing on the received audio in parallel to steps (b) and (c) to generate processed unprotected audio data.

2. The method as claimed in claim 1, wherein the step of establishing a communications link comprises establishing a communications link between a cryptographic protection module on the headset and the biometrics module on the host device, which includes a pass-through link via a data processing element of the host device, e.g. through an Applications Processor of the host device.

3. The method as claimed in claim 1, wherein the method comprises the steps of:
   receiving a trigger event at the headset device indicative of a user interaction,
   wherein at least one of steps (b)-(e) are performed responsive to said step of receiving a trigger event.

4. The method as claimed in claim 3, wherein the step of receiving a trigger event comprises at least one of the following:
   receiving an indication of a voice keyword detection, from the headset device and/or from the host device;
   receiving an indication of a voice activity detection, from the headset device and/or from the host device; or
   receiving an indication of a physical user interaction, from the headset device and/or from the host device.

5. The method as claimed in claim 1, wherein the method further comprises the steps of:
   buffering the received audio at the headset device; and
   responsive to receiving a trigger event at the headset device, performing at least one of steps (b)-(e) on the buffered audio.

6. The method as claimed in claim 5, wherein the step of transmitting comprises:
   transmitting the protected buffered audio from the headset device to the biometrics module at the host device using an asynchronous data link.

7. The method as claimed in claim 1, wherein the step of performing a cryptographic protection comprises:
   creating a cryptographic digital signature of the received audio,
   wherein the step of transmitting comprises transmitting the received audio with the cryptographic digital signature.

8. The method as claimed in claim 7, wherein the step of cryptographically signing the received audio comprises a Symmetric signing of data (e.g. using HMAC) or an Asymmetric signing of data (e.g. using DSA or ECDSA).

9. The method as claimed in claim 7, wherein the step of performing a cryptographic protection comprises:
   creating an encrypted version of the received audio,
   wherein the step of transmitting comprises transmitting the encrypted version of the received audio.

10. The method as claimed in claim 1, wherein the step of performing a cryptographic protection comprises cryptographically signing or encrypting the received audio at the headset device within a CODEC provided in the headset device.

11. The method as claimed in claim 1, wherein the method further comprises the step of:
    performing a feature extraction on the received audio, to provide feature data of the received audio,
    wherein at least one of steps (b)-(e) are performed on the feature data of the received audio.

12. The method as claimed in claim 1, wherein the method comprises the further step of:

responsive to said voice biometric authentication, initialising audio playback from the host device to the headset device based on the result of said voice biometric authentication.

13. The method as claimed in claim 12, wherein audio playback may be via the same communications link established for sending the audio and the cryptographic authentication from the headset device to the biometrics module on the host device.

14. The method as claimed in claim 1, wherein the step of performing audio processing may comprise performing active noise control at the headset device based on the received audio.

15. The method as claimed in claim 1, wherein the method further comprises the step of:
   at the host device, verifying the headset device prior to the steps of verifying the protected audio at the biometrics module and performing a voice biometric authentication on the verified audio at the biometrics module.

16. The method as claimed in claim 15, wherein the step of verifying the headset device comprises a cryptographic verification of the headset device.

17. The method as claimed in claim 1, wherein the step of transmitting comprises:
   establishing a communications link between the headset device and the biometrics module on the host device; and
   sending the protected audio from the headset device to the biometrics module on the host device via said communications link.

18. The method as claimed in claim 17, wherein the step of establishing a communications link comprises establishing a direct communications link between a cryptographic protection module on the headset and the biometrics module on the host device, without intervening data processing elements.

19. A method as claimed in claim 1 further comprising transmitting the processed unprotected audio data from the headset device to the host device.

20. The method as claimed in claim 17, wherein the step of establishing a communications link comprises:
   establishing an asynchronous data path between the headset device and the biometrics module on the host device.

21. The method as claimed in claim 17, wherein the step of establishing a communications link comprises:
   establishing a wired communications link with an asynchronous communications protocol, e.g. using USB link with a USB Serial endpoint type or any suitable wired communications protocol, or
   establishing a wireless communications link with an asynchronous communications protocol, e.g. using BlueTooth™ with RFCOMM protocol, or any suitable wireless communications protocol.

22. A system for performing biometric authentication, the system comprising:
   a host device, the host device comprising a biometric authentication module; and
   a headset device coupled with said host device, the headset device arranged to (a) receive audio,
   wherein the headset device comprises a cryptographic protection module arranged to (b) perform a cryptographic protection of received audio to generate protected audio, the headset device arranged to (c) transmit the protected audio from the headset device to the biometric authentication module at the host device, and
   wherein the biometric authentication module at the host device is arranged to (d) verify the protected audio at the biometric authentication module, and responsive to said verification, the biometric authentication module is arranged to (e) perform a biometric authentication on the protected audio;
   wherein the headset device is arranged to:
      perform audio processing on the received audio in parallel to steps (b) and (c) to generate processed unprotected audio data.

23. The system as claimed in claim 22, wherein the headset device comprises any suitable device arranged to receive audio from a user, e.g. an audio headset, headphones, earbuds.

24. The system as claimed in claim 22, wherein the host device comprises any suitable data processing device provided with a biometric authentication module for user authentication, e.g. a mobile phone, a tablet computer, a personal computer.

25. A headset device for performing biometric authentication, wherein the headset device is configured to be coupled with a host device and wherein the headset device is arranged to receive audio, the headset device comprising:
   a cryptographic protection module arranged to perform a cryptographic protection of received audio to generate protected audio, the headset device arranged to transmit the protected audio from the headset device to a biometric authentication module at the host device,
   wherein the headset device is arranged to:
   perform audio processing on the received audio in parallel to performing the cryptographic protection of the received audio, to generate processed unprotected audio data.

* * * * *